US012530901B2

(12) United States Patent
Venetianer et al.

(10) Patent No.: US 12,530,901 B2
(45) Date of Patent: Jan. 20, 2026

(54) LARGE VEHICLE DETECTION IN VIDEO

(71) Applicant: MOTOROLA SOLUTIONS, INC., Chicago, IL (US)

(72) Inventors: Peter L. Venetianer, McLean, VA (US); Nicholas Alcock, West Vancouver (CA); Yu-Jhen Chuang, Malden, MA (US); Hal J. Friesen, Vancouver (CA); Brandon Miles, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 110 days.

(21) Appl. No.: 18/399,103

(22) Filed: Dec. 28, 2023

(65) Prior Publication Data

US 2025/0218188 A1 Jul. 3, 2025

(51) Int. Cl.

| | |
|---|---|
| ***G06V 20/54*** | (2022.01) |
| ***G06T 7/60*** | (2017.01) |
| ***G06T 7/70*** | (2017.01) |
| ***G06V 10/25*** | (2022.01) |

(52) U.S. Cl.

CPC ................ *G06V 20/54* (2022.01); *G06T 7/60* (2013.01); *G06T 7/70* (2017.01); *G06V 10/25* (2022.01); *G06T 2207/30241* (2013.01); *G06V 2201/07* (2022.01)

(58) Field of Classification Search

None

See application file for complete search history.

(56) References Cited

U.S. PATENT DOCUMENTS

| | | | | |
|---|---|---|---|---|
| 10,878,227 | B2 | 12/2020 | Alcock et al. | |
| 11,580,783 | B2 | 2/2023 | Alcock et al. | |
| 2023/0206470 | A1 * | 6/2023 | Kim | G06T 7/248 382/103 |
| 2024/0135705 | A1 * | 4/2024 | Poole | G06V 10/70 |

OTHER PUBLICATIONS

Bhardwaj et al., "AutoCalib: Automatic Traffic Camera Calibration at Scale," ACM Trans. Sen. Netw., 14: Nov. 2018, Article 19 (27 pages).

Brown et al., "Self-Calibration from Vehicle Information," 2015 (6 pages).

* cited by examiner

*Primary Examiner* — Samuel D Fereja

(74) *Attorney, Agent, or Firm* — Michael Best & Friedrich LLP

(57) ABSTRACT

Examples provide a system for detecting large vehicles. The system includes an electronic processor configured to obtain video data from an image sensor, determine a bounding box bounding a detected vehicle in a plurality of frames of the video data, determine a trajectory of the detected vehicle based on changes in location of the bounding box in the plurality of frames, and determine a position of the detected vehicle within at least one frame of the plurality of frames. Based on the trajectory of the detected vehicle, the bounding box, and the position of the detected vehicle within the at least one frame, the electronic processor determines a length of the detected vehicle, and determines whether the length is greater than a threshold. In response to the length of the detected vehicle being greater than a threshold, the electronic processor makes a determination that a large vehicle is detected.

18 Claims, 7 Drawing Sheets

78 76

Average Car Size In Given Direction

Detected Vehicle Size Vs Average Car Size

LARGE VEHICLE DETECTION IN VIDEO

BACKGROUND

Attributes of a detected vehicle may be used in anomaly detection, object appearance searching, or other image and video analysis rules.

Figure 1:
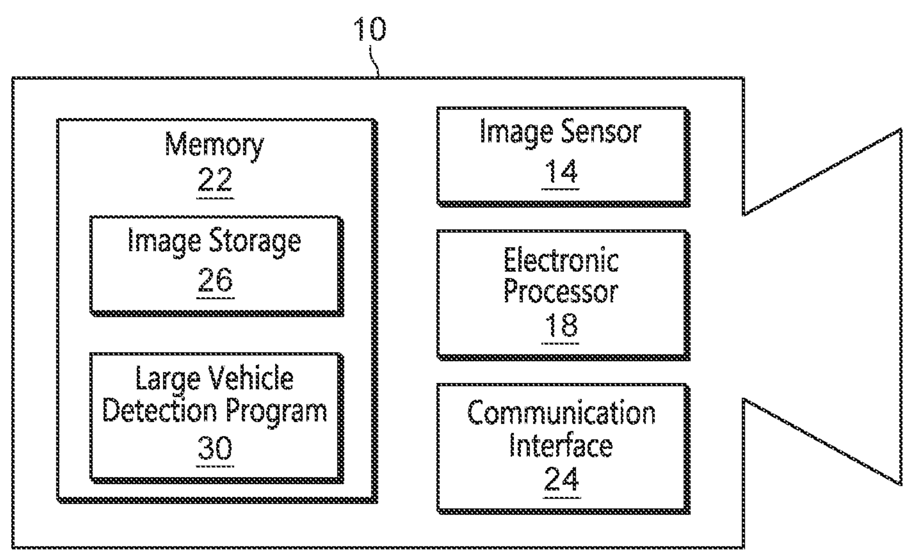
FIG. 1 illustrates a camera, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Object detection is a computer vision technology that involves identifying and locating objects in a digital image or video (sometimes herein, simply referred to as an "image" or "video" without expressly differentiating between images and video). One goal of object detection is to identify an object as belonging to a class of things. For example, existing object detection systems are generally capable of identifying or recognizing plants, animals, people, and vehicles in an image. In many object detection systems, when an object is identified, a computer-generated bounding box is placed around the object of interest in the image to help locate the object (for example, relative to an origin).

Object detection has many applications and is often used in security and traffic monitoring systems. There are many algorithms and models available to perform object detection. However, and as is explained below, determining the size of an object is not a task that existing systems always perform as well as desired. Many object detection and vehicle detection methods classify vehicles by type, such as "bus," "car," "truck," and the like, rather than by size of the vehicle. However, the size of vehicles may vary greatly from type to type and within a given type. For example, buses and trucks may respectively have large variations in size. Additionally, the classification-based approach often requires the camera to be trained with a substantial amount of data.

Other methods of estimating vehicle size require cameras to be fully calibrated at the site the camera is located. Camera calibration generally requires a known calibration target (e.g., a known pattern, such as a checkerboard image) at a known location (i.e., the region of interest for which the camera will perform object detection). As a result, performing camera calibration with respect to high traffic areas, such as freeways, is often unfeasible. Further, data-based methods of camera calibration require a camera to assume that a standard feature has a standard size (e.g., that all humans are approximately six feet tall).

Some methods for detecting large vehicles merely rely on the size of a bounding box surrounding a detected vehicle for determining whether the detected vehicle is a large vehicle. However, the viewing angle of the camera may distort these measurements. For example, a bounding box bounding a tall vehicle that is travelling at a non-horizontal angle relative to the camera is much larger than a bounding box bounding a vehicle travelling horizontally relative to the camera.

Thus, there is a need for large vehicle detection that provides accuracy while remaining computationally inexpensive. One example provides a system for detecting large vehicles. The system includes an electronic processor communicatively connected to an image sensor and configured to: obtain video data from the image sensor; determine a bounding box bounding a detected vehicle in a plurality of frames of the video data; determine a trajectory of the detected vehicle based on changes in location of the bounding box in the plurality of frames; determine a position of the detected vehicle within at least one frame of the plurality of frames; based on the trajectory of the detected vehicle, the bounding box, and the position of the detected vehicle within the at least one frame, determine a length of the detected vehicle; determine whether the length of the detected vehicle is greater than a threshold; and in response to the length of the detected vehicle being greater than a threshold, make a determination that a large vehicle is detected.

In some aspects, the electronic processor is configured to determine the length of the detected vehicle by computing a line segment extending parallel to the trajectory and being bound by the bounding box.

In some aspects, the line segment is positioned across a largest distance within the bounding box according to the trajectory.

In some aspects, the electronic processor is configured to determine the position of the detected vehicle in the at least one frame of the plurality of frames by: placing a grid over the at least one frame, the grid defining a plurality of cells, and selecting a first cell of the plurality of cells, wherein at least a portion of the bounding box is located within the first cell.

In some aspects, the portion of the bounding box located within the first cell includes a lowermost central point of the bounding box.

In some aspects, the electronic processor is further configured to determine the threshold based on the trajectory and the position of the detected vehicle within the at least one frame.

In some aspects, the electronic processor is configured to determine whether the length of the detected vehicle is greater than a threshold by: determining a ratio of the length of the detected vehicle to an average measured car length at the position of the detected vehicle within the at least one frame and at the trajectory of the detected vehicle; and determining whether the ratio of the length of the detected vehicle to the average measured car length is greater than or equal to a size multiplier.

In some aspects, the electronic processor is configured to determine the size multiplier by: obtaining, before obtaining the video data, additional video data including a second plurality of frames; determining a plurality of second bounding boxes bounding respective second detected vehicles known to be cars in the second plurality of frames; determining a plurality of third bounding boxes bounding respective third detected vehicles known to be large vehicles in the second plurality of frames; determining respective lengths of the second detected vehicles and third detected vehicles; and determining the size multiplier as a ratio of an average length of the third detected vehicles to an average length of the second detected vehicles.

In some aspects, In some aspects, the electronic processor is configured to determine the size multiplier during an offline training period.

In some aspects, the size multiplier is a user-selected value.

In some aspects, the electronic processor is configured to determine the size multiplier at the position of the detected vehicle within the at least one frame by interpolating and/or extrapolating the average measured car length based on average measured car lengths at positions neighboring the position of the detected vehicle.

In some aspects, the electronic processor is configured to determine the average measured car length at the position of the detected vehicle and at the trajectory of the detected vehicle by: obtaining, before obtaining the video data, additional video data including a second plurality of frames; determining a plurality of second bounding boxes bounding respective second detected vehicles known to be cars in the second plurality of frames in the second plurality of frames; determining respective lengths of the respective second detected vehicles at respective positions and trajectories; and for each respective position and trajectory, determining an average length of the second detected vehicles at the respective position and trajectory.

In some aspects, the electronic processor is configured to determine the average measured car length at the position of the detected vehicle and at the trajectory of the detected vehicle during an onsite training period, and wherein a field of view associated with the image data is the same as a field of view associated with the additional video data.

In some aspects, the electronic processor is configured to determine the average measured car length at the position of the detected vehicle within the at least one frame by interpolating and/or extrapolating the average measured car length based on average measured car lengths at positions neighboring the position of the detected vehicle.

In some aspects, the average measured car length is a user-selected value.

In some aspects, the image sensor and the electronic processor are included in a camera that is at least partially uncalibrated.

Another example provides a method for detecting large vehicles. The method includes obtaining video data from an image sensor; determining a bounding box bounding a detected vehicle in a plurality of frames of the video data; determining a trajectory of the detected vehicle based on changes in location of the bounding box in the plurality of frames; determining a position of the detected vehicle within at least one frame of the plurality of frames; based on the trajectory of the detected vehicle, the bounding box, and the position of the detected vehicle within the at least one frame, determining a length of the detected vehicle; determining whether the length of the detected vehicle is greater than a threshold; and, in response to the length of the detected vehicle being greater than a threshold, making a determination that a large vehicle is detected.

In some aspects, determining the length of the detected vehicle includes computing a line segment extending parallel to the trajectory and being bound by the bounding box.

In some aspects, the line segment is positioned across a largest distance within the bounding box according to the trajectory.

In some aspects, determining the position of the detected vehicle in the at least one frame of the plurality of frames includes: placing a grid over the at least one frame, the grid defining a plurality of cells, and selecting a first cell of the plurality of cells, wherein at least a portion of the bounding box is located within the first cell.

Examples are herein described with reference to flowchart illustrations and/or block diagrams of methods, apparatus (systems) and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 schematically illustrates an imaging device 10, according to some examples. The imaging device 10 is, for example, a camera including an image sensor 14 configured to capture images (e.g., a plurality of images, or frames, included in video). The image sensor 14 may be operable to capture light within the visible light frequency range and/or outside of the visible light frequency range (e.g., infrared or ultraviolet light). In some instances, the image sensor 14 includes multiple image sensors 14 operable to capture light in different frequency ranges.

The imaging device 10 also includes an electronic processor 18 (for example, a microprocessor or other electronic device). The electronic processor 18 is electrically coupled to the image sensor 14, a memory 22, and a communication interface 24. The electronic processor 18 includes suitable processing circuitry for performing the methods described herein or any combination of suitable processing circuitry. For example, the electronic processor 18 may include a digital signal processor (DSP), a graphics processing unit (GPU) embedded processor, a vision processing unit, etc. One or more circuit units included in the electronic processor 18 may operate independently or in parallel with one another.

In the example shown, the memory 22 stores data and computer program instructions for performing, among other things, the methods described herein. For example, the memory 22 includes image storage 26 for storing images captured by the image sensor 14 and a large vehicle detection program 30 executable by the electronic processor 18 for detecting large vehicles in video data captured by the imaging device 10. The memory 22 may include read only memory (ROM), random access memory (RAM), other non-transitory computer-readable media, or a combination thereof.

As used herein, the term "large vehicles" refers to vehicles greater than a threshold size. For example, large vehicles may be vehicles at or above a particular weight class (e.g., class 6 vehicles or greater, class 7 vehicle or greater, class 8 vehicles or greater, etc.), or vehicles having a minimum length (e.g., 30 feet or greater, 40 feet or greater, 60 feet or greater, 70 feet or greater, etc.). Large vehicles are differentiated herein from cars. As used herein, "cars" generally refers to four-wheeled vehicles at or below a particular weight class (e.g., class 1 vehicles or smaller, class 2 vehicle or smaller, class 3 vehicles or smaller, etc.), or having a maximum length (e.g., 25 feet or smaller, 20 feet or smaller, 15 feet or smaller).

The imaging device 10 is operable to send and receive data, such as a video stream, video analytics data, parameter information, and/or commands to one or more external devices using the communication interface 24. In some instances, the large vehicle detection program 30 is stored external to the imaging device 10. For example, the large vehicle detection program 30 may be stored, in whole or in part, in a user device separate from the imaging device 10, a server of a local area network, a cloud-based server, or a combination thereof. Further, the large vehicle detection program 30 may be implemented as software, firmware, or a combination thereof.

The imaging device 10 may include additional components other than those described with respect to FIG. 1. The imaging device 10 may alternatively be referred to herein as the camera 10. The camera 10 may be a calibrated camera 10, an uncalibrated camera 10, or a partially uncalibrated camera 10. In other words, large vehicle detection according to the methods described herein does not require calibration of the camera 10, which is often a computationally expensive process.

Figure 2A:
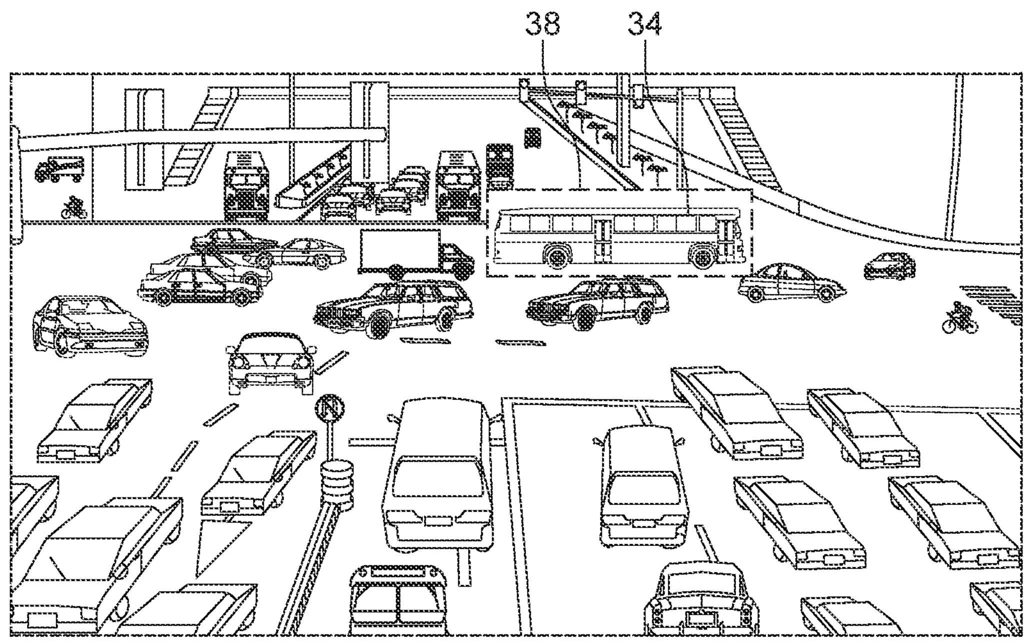
FIG. 2A illustrates a scene captured by a camera and including a large vehicle, according to some examples.
Figure 2B:
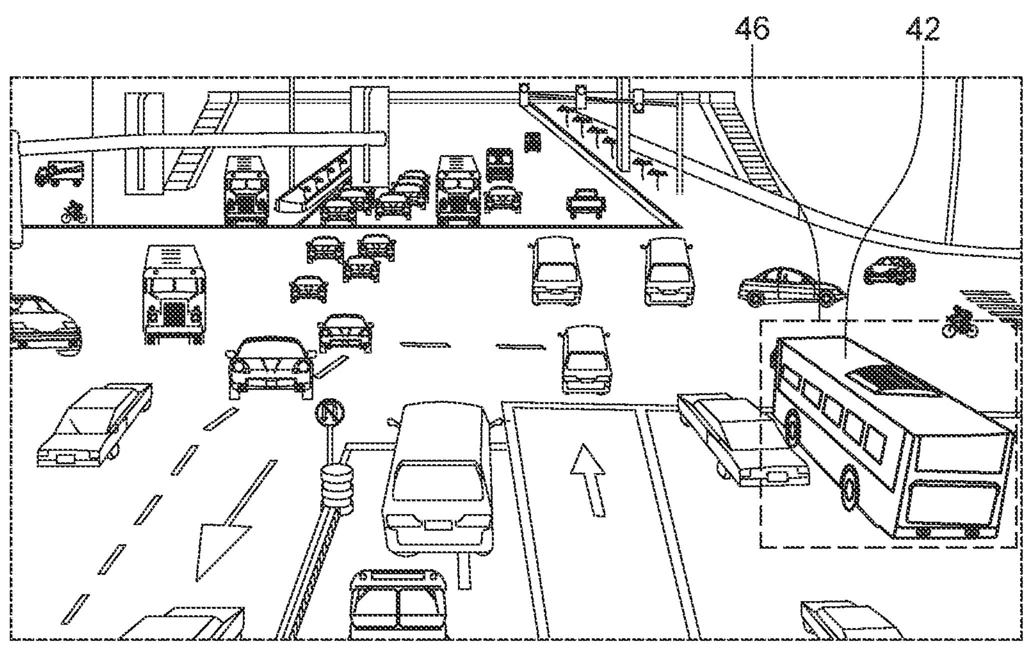
FIG. 2B illustrates a scene captured by a camera and including a large vehicle, according to some examples.

As described above, large vehicle detection methods that rely solely on the size of bounding boxes to determine vehicle size often result in inaccurate measurements of vehicle length. For example, FIG. 2A illustrates a scene captured by the camera 10 including detected first bus 34 having a first trajectory relative to the camera 10 (i.e., a generally horizontal trajectory). A first bounding box 38 generated by the camera 10 bounds the detected first bus 34. In contrast, FIG. 2B illustrates a detected second bus 42 substantially similar to the first bus 34 but having a second trajectory relative to the camera (i.e., approximately perpendicular to the first trajectory). A second bounding box 46 generated by the camera 10 bounds the detected second bus 42.

Despite the first and second buses 34, 42 respectively shown in FIGS. 2A and 2B being, in actuality, substantially the same size, the bounding boxes 38, 46 respectively bounding the buses 34, 42 each have different lengths and different areas due to the respective differences in trajectory and position within the frame (e.g., distance of each bus 34, 42 from the image sensor 14). Bounding boxes alone thus do not provide an accurate representation of vehicle size.

Figure 3:
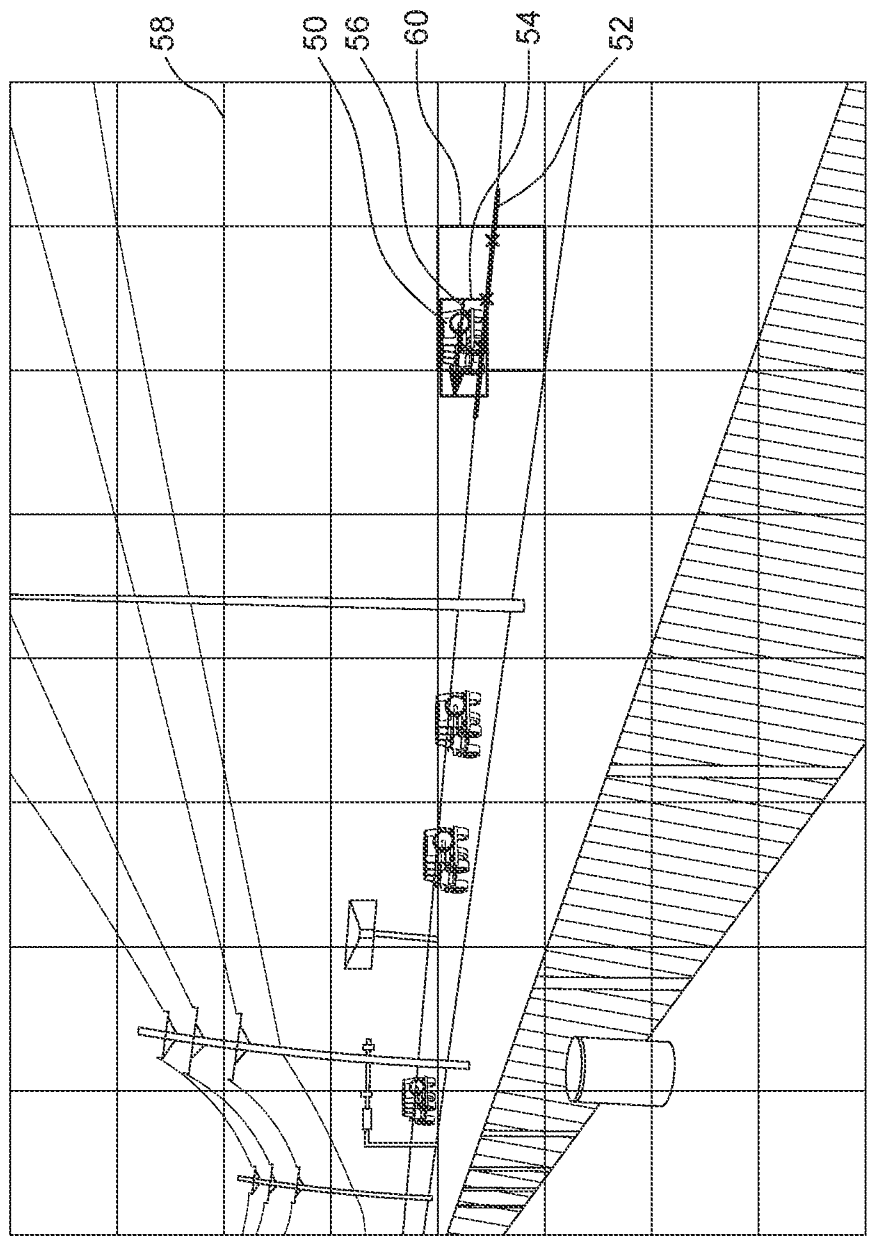
FIG. 3 illustrates an analysis performed by a camera for determining length of a detected vehicle, according to some examples.

Therefore, referring now to FIG. 3, illustrating a scene captured by the camera 10 including a detected vehicle 50, the electronic processor 18 determines the length of the detected vehicle 50 based on a trajectory 52 of the detected vehicle 50 determined by the electronic processor 18 over a plurality of frames of the video data. For example, for each of a plurality of frames of the video data, the electronic processor 18 may track (e.g., using Kalman tracking or the like) a location of a given point in a bounding box 54 bounding the detected vehicle 50 over each of the plurality of frames (e.g., a lowermost central point in the bounding box 54, a central point in the bounding box 54, or the like).

Using the determined trajectory 52, the electronic processor 18 computes a line segment 56 extending parallel to the trajectory 52, the line segment 56 being bounded by a perimeter of the bounding box 54. The electronic processor 18 computes the line segment 56 such that the line segment 56 is positioned across a largest distance within the bounding box 54 according to the trajectory 52.

The computed line for a vehicle detected in, for example, a background of an image captured by the camera 10 may have a different length than a computed line for the same sized vehicle having the same trajectory but detected in a foreground of an image captured by the camera 10. Therefore, the electronic processor 18 further determines the length of the detected vehicle 50 based on a position of the detected vehicle in at least one frame of the video data.

The electronic processor 18 determines the position of the detected vehicle 50 by, for example, placing a grid 58 having a plurality of grid cells over the frame, and selects a grid cell 60 containing at least a portion of the bounding box 54. The electronic processor 18 may determine the cell 60 to select such that the selected cell 60 includes a given point in the bounding box 54 (e.g., a lowermost central point in the bounding box 54, a central point in the bounding box 54, or the like).

The electronic processor 18 determines a relative size of the detected vehicle 50 by comparing the computed length of the line segment 56 to lengths of computed lines corresponding to other detected vehicles (e.g., other detected cars and/or other detected large vehicles) having the same trajectory 52 (and thus the same angle relative to the camera 10) within the same grid cell 60. For example, before performing large vehicle detection, the electronic processor 18 may undergo a training period for learning the average measured car lengths at various positions and trajectories in the grid 58. While physical car lengths (i.e., the actual length of the car) remains constant, the measured car length is dependent on the trajectory and position of the car relative to the camera 10. The electronic processor 18 undergoes the average car length training at the same location where the camera 10 is placed for performing the large vehicle detection (i.e., such that a field of view of the camera 10 during large vehicle detection is the same as the field of view during the training period). This average car length training period may otherwise be referred to herein as an online, or onsite, training period.

Figure 4A:
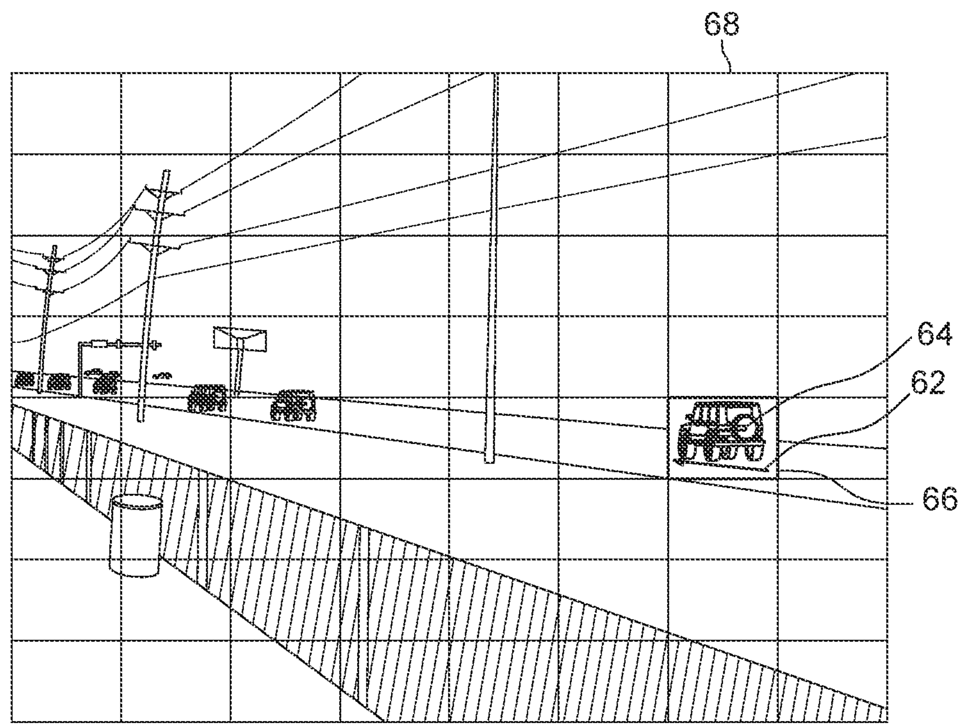
FIG. 4A illustrates an analysis performed by a camera for determining an average car length at a given position and direction of travel, according to some examples.
Figure 4B:
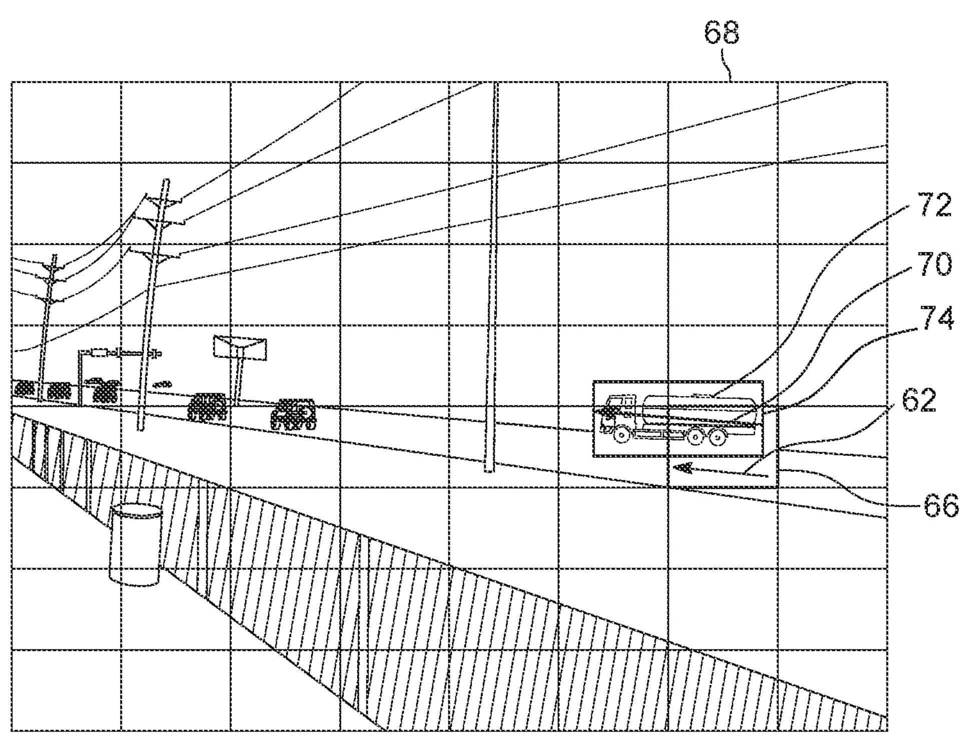
FIG. 4B illustrates an analysis performed by a camera for detecting a large vehicle, according to some examples.

Referring now to FIGS. 4A-4B, during the onsite training period, the electronic processor 18 receives video data at the same viewing angle and of the same scene (i.e., region of interest) that is to be employed during large vehicle detection. The electronic processor 18 identifies known cars, such as the known car 64 illustrated in FIG. 4A, detected in the onsite training video data, and determines the lengths, such as the length 62, of the detected known cars 64. The electronic processor 18 may determine that a detected vehicle (e.g., the detected vehicle 64) is a known car based on, for example, metadata included with the onsite training video data, based on user confirmation that the detected vehicle 64 is a known car, based on an object recognition classification of the known car 64 (e.g., a classification that the detected vehicle is a sedan or other type of car), and/or the like.

As described above, the average measured car length used in large vehicle detection may vary according to trajectory of detected vehicles (i.e., trajectory of detected vehicles relative to the viewing angle of the camera 10) and position of the detected vehicle relative to the camera 10. Accordingly, the electronic processor 18, during the onsite training period, determines a plurality of average measured car length values for various positions and trajectories. In instances where the onsite training video data does not include a known car for a given combination of trajectory and position, the electronic processor 18 may extrapolate and/or interpolate the average measured car length based on average measured car lengths corresponding to neighboring trajectories and/or positions.

As described above, FIG. 4A illustrates a scene including an example of an average measured car length 62 determined by the electronic processor 18 for an average car 64 having a given trajectory and position (i.e., a given grid cell 66 of a grid 68) within a frame. FIG. 4B illustrates a comparison of the average measured car length 62 for the given trajectory and position (i.e., the grid cell 60) to a computed length 70 of a detected vehicle 72 bound by a bounding box 74 and having the same given trajectory and position as the example average car 64 illustrated in FIG. 4A.

Based on the comparison, or ratio, of the computed length 70 of the detected vehicle 72 to the average measured car length 62 for the same given position and trajectory, the electronic processor 18 determines whether the detected vehicle 72 is a large vehicle. The electronic processor 18 determines whether the detected vehicle 72 is a large vehicle by determining whether the ratio of the length 70 of the detected vehicle to the average measured car length 62 meets or exceeds a predetermined car size multiplier value that indicates a size ratio between cars and large vehicles. For an example car size multiplier value of three, the electronic processor 18 determines that the detected vehicle 72 is a large vehicle when the length 70 of the detected vehicle 72 is at least three times greater than the average measured car length 62 for the given trajectory and position.

In some instances, the car size multiplier value, otherwise referred to herein as the size multiplier, is a user-selected value. For example, the user may select a physical size multiplier value based on physical vehicle length and indicating that, as defined by the user, large vehicles are any vehicle having a physical length that is a predetermined multiple greater than an average physical length of a car.

The electronic processor 18 translates the physical size multiplier to a measured size multiplier that is dependent in part on the trajectory of detected vehicles relative to the camera 10. For a variety of viewing angles, the electronic processor 18 determines corresponding measured size multipliers based on the physical size multiplier during an offline size multiplier training period. The electronic processor 18 may undergo the size multiplier training period before the camera 10 is positioned for performing the large vehicle detection (i.e., before undergoing the onsite average measured car length training period and before performing large vehicle detection). In other words, the process of determining measured size multipliers is independent from the field of view that the camera 10 may have of a region of interest during large vehicle detection. The size multiplier training period may otherwise be referred to herein as the offline, or offsite, training period.

During the offline training period, the electronic processor 18 receives video data of a range of video data representing a variety of camera viewing angles and traffic patterns. In some instances, the video data used in the offline training period is selected such that it is representative of vehicles that the electronic processor 18 is likely to encounter during operation. For example, average car sizes and average large vehicle sizes may vary by country or according to geographical regions. Therefore, the respective size multipliers for a first region where car sizes tend to be larger than the second region but large vehicle sizes (e.g., buses and trucks) tend to be the same for both regions may be different from one another. The region having larger cars thus has a smaller car size multiplier defining the size ratio between cars and large vehicles than the region having generally smaller cars. In some instances, the size multiplier training is performed only once for each geographical region, and the results of the size multiplier training are used for large vehicle detection operations in a plurality of cameras 10 for the geographical region.

Alternatively or in addition to performing a size multiplier training, the electronic processor 18 may determine measured size multipliers based on camera geometry and geographical region. For example, for a given vehicle trajectory and three-dimensional ("3D") vehicle size, which may vary according to geographical region, the electronic processor 18 may determine a projected bounding box and a measured car length, and determine the size multiplier value by comparing a projected bounding box size of a car with a projected bounding box size of a truck.

Figure 5A:
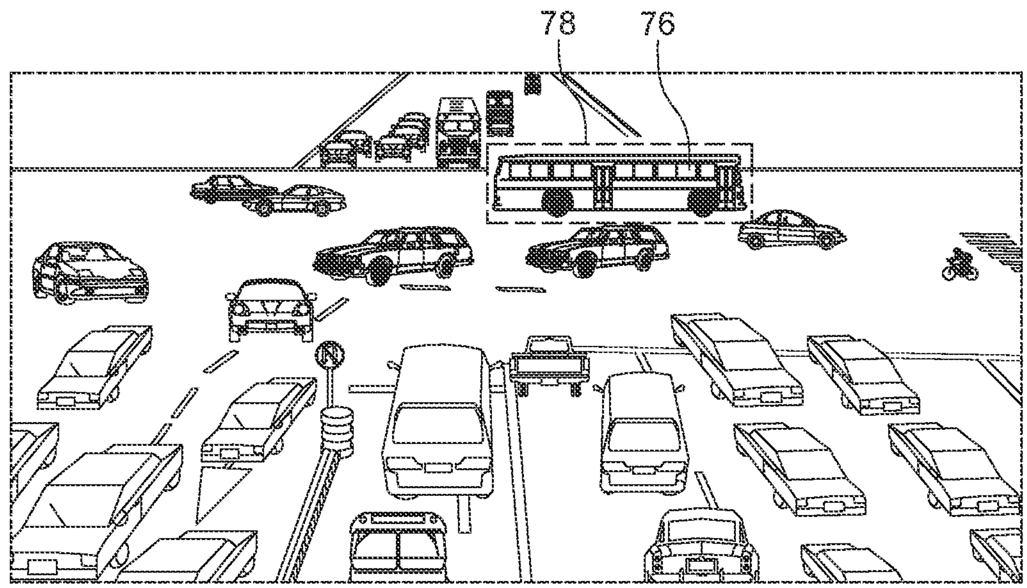
FIG. 5A illustrates an analysis performed by a camera for determining a size multiplier value for a given position and trajectory, according to some examples.
Figure 5B:
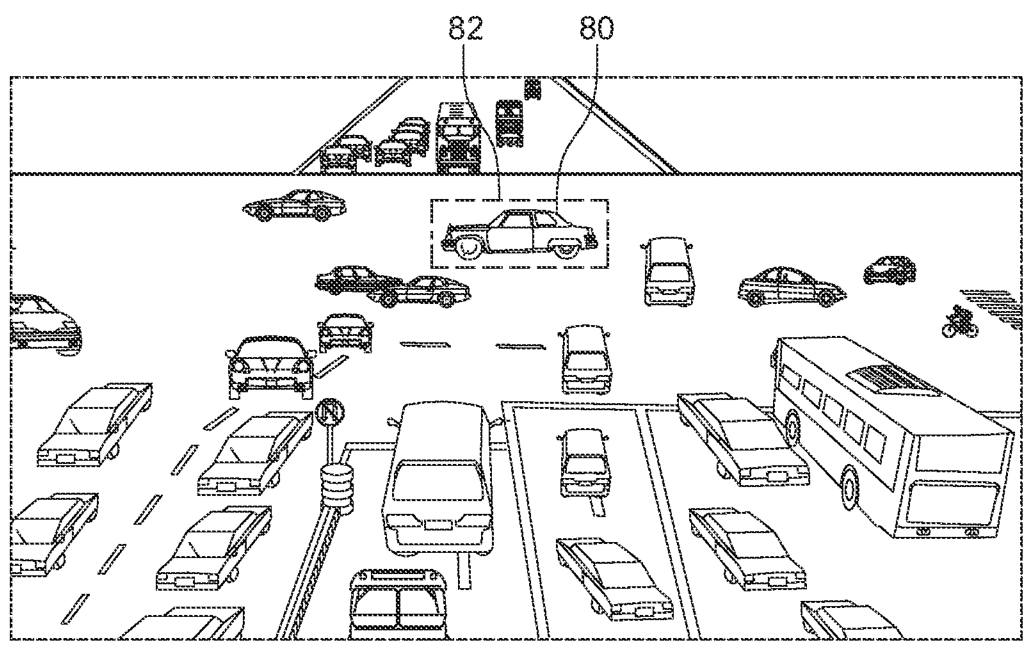
FIG. 5B illustrates an analysis performed by a camera for determining a size multiplier value for a given position and trajectory, according to some examples.

FIGS. 5A and 5B each illustrate offline training scenes captured at a first viewing angle and including a plurality of vehicles. In the scene illustrated in FIG. 5A, the electronic processor 18 detects a first vehicle 76 known to be a large vehicle. The first vehicle 76 is bounded by a bounding box 78 and has a first, substantially horizontal trajectory. The electronic processor 18 may determine that the first detected vehicle 76 is a known large vehicle based on, for example, metadata included with the training video data, based on user confirmation that the first detected vehicle 76 is a known large vehicle, based on an object recognition classification of the first detected vehicle 76 (e.g., a classification that the first detected vehicle is a bus or other type of large vehicle), and/or the like.

Similarly, in the scene illustrated in FIG. 5B, the electronic processor 18 detects a second detected vehicle 80 known to be a car. The second detected vehicle 80 is bounded by a bounding box 82 and has the same first trajectory as the first detected known large vehicle 76 of FIG. 5A. The electronic processor 18 may determine that the second detected vehicle 80 is a known car based on, for example, metadata included with the training video data, based on user confirmation that the second detected vehicle 80 is a known car, based on an object recognition classification of the second detected vehicle 76 (e.g., a classification that the second detected vehicle 80 is a sedan or other type of car), and/or the like.

Responsive to determining that the first detected vehicle 76 (i.e., the known large vehicle 76) and the second detected vehicle 80 (i.e., the known car) are located in approximately the same given position within each respective frame have the same first trajectory, the electronic processor 18 computes a measured size multiplier for the given position and first trajectory as a ratio of the length of the known large vehicle 76 to the length of the known car 80. The electronic processor 18 may determine the lengths of the known large vehicle 76 and known car 80 in a manner substantially similar as that described above with respect to FIG. 3.

In some instances, for example when the offline training video data for a given viewing angle includes multiple known large vehicles 76 and/or known cars 80 having the same position and trajectory, the electronic processor 18 determines the measured size multiplier as a ratio of an average measured length of the known large vehicles 76 to an average measured length of the known cars 80.

As described above, the measured size multiplier used in large vehicle detection may vary according to trajectory of detected vehicles (i.e., trajectory of detected vehicles relative to the viewing angle of the camera 10) relative to the camera 10. Accordingly, the electronic processor 18, during the offline training period, determines a plurality of measured size multiplier values for various positions and trajectories. In instances where the offline training video data does not include a known large vehicle and/or known car for a given combination of trajectory and position, the electronic processor 18 may extrapolate and/or interpolate the measured size multiplier value based on measured size multiplier values corresponding to neighboring trajectories and/or positions.

Figure 6:
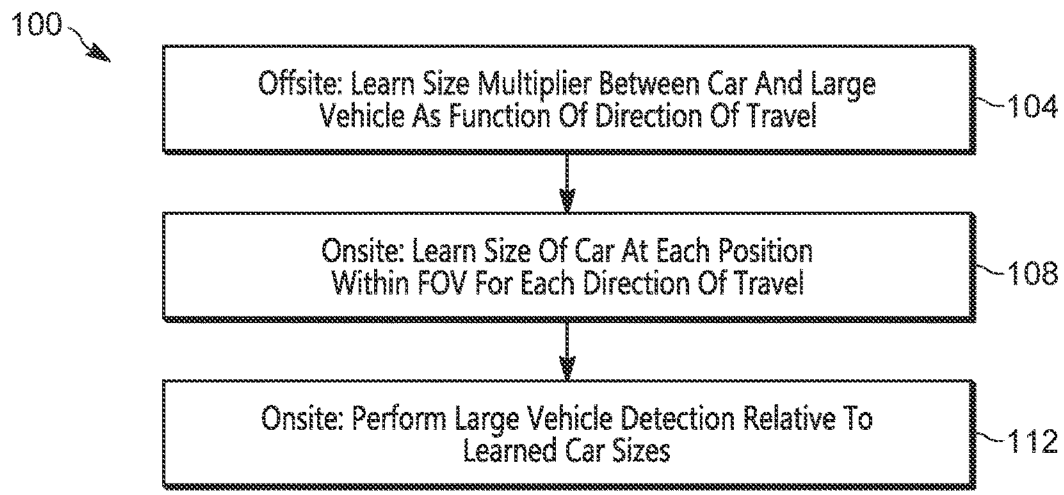
FIG. 6 illustrates a method for detecting large vehicles, according to some examples.

FIG. 6 illustrates a method 100 for training the electronic processor 18 and performing large vehicle detection. The method 100 includes performing, with the electronic processor 18, a first, offline training to learn measured size multipliers between cars and large vehicles as a function of direction of travel (i.e., trajectory) (at block 104).

Figure 7:
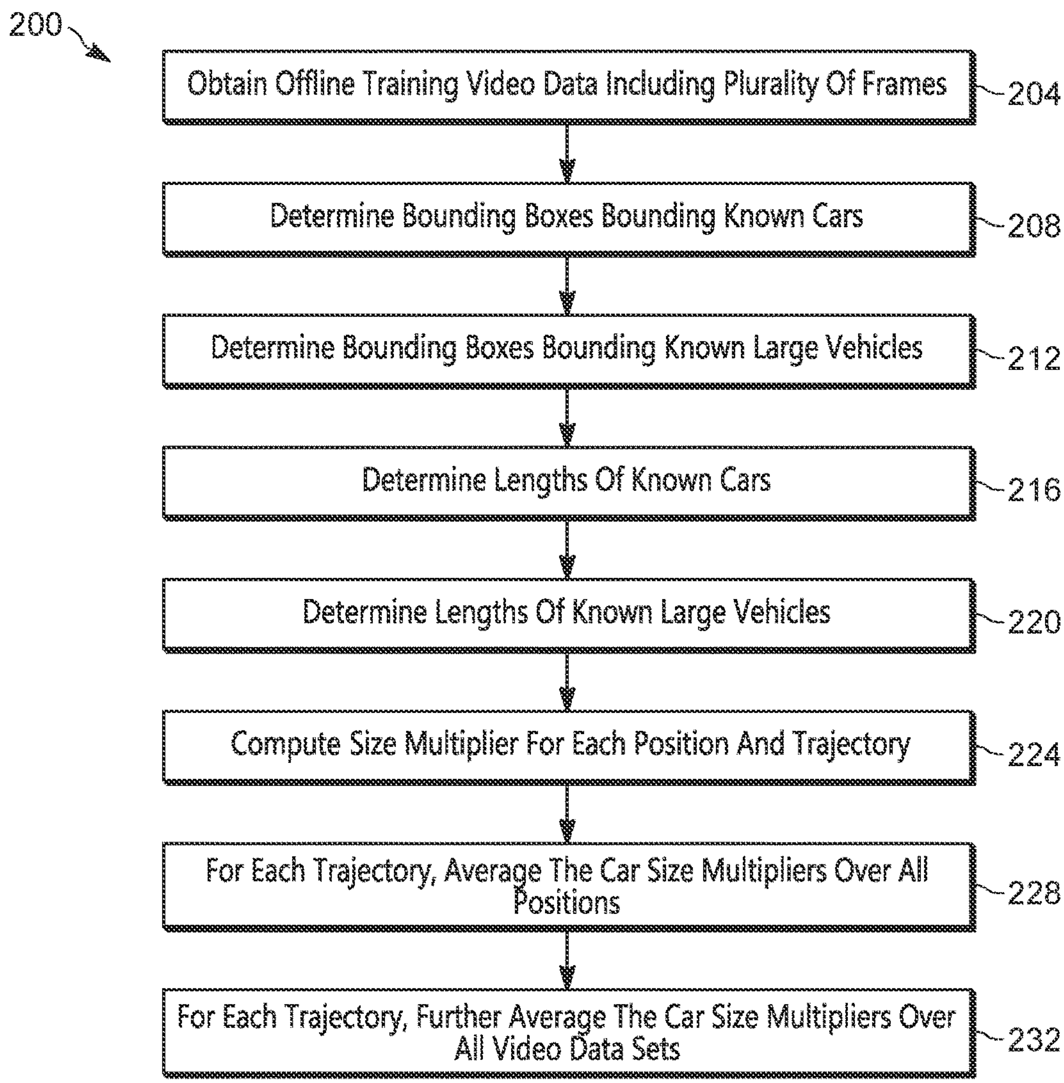
FIG. 7 illustrates a method for learning car size multiplier values, according to some examples.

The offline size multiplier training performed at block 104 may be substantially similar to the offline size multiplier training described above with respect to FIGS. 5A and 5B. For example, FIG. 7 illustrates a method 200 implemented by, for example, the electronic processor 18 for performing size multiplier training (e.g., at block 104 of the method 100). The method 200 includes obtaining offline training video data including a plurality of frames (at block 204). The offline training video data may feature a variety of scenes (i.e., a variety of regions of interest) at a variety of viewing angles. The offline training video data may be captured by the image sensor 14 and/or from a different image sensor remote from the camera 10.

The electronic processor 18 determines a plurality of bounding boxes bounding respective detected vehicles known to be cars (such as, for example, the known car 80 illustrated in FIG. 5B) in the plurality of frames (at block 208). The electronic processor 18 also determines a plurality of bounding boxes bounding respective detected vehicles known to be large vehicles (such as, for example, the known large vehicle 76 illustrated in FIG. 5A) in the plurality of frames (at block 212).

The electronic processor 18 determines the respective lengths of the known cars (e.g., based on respectively determined trajectories and bounding boxes of the respective known cars) (at block 216), and determines the respective lengths of the known large vehicles (e.g., based on respectively determined trajectories and bounding boxes of the respective known large vehicles) (at block 220). For each of a plurality of respective combinations of positions within the field of view (e.g., respective grid cells) and trajectories, the electronic processor 18 determines a corresponding size multiplier as a ratio of an average length of the known large vehicles associated with the respective combination of position and trajectory to an average length of the known cars associated with the respective combination of position and trajectory (at block 224). For each trajectory and each set of offline training video data, the electronic processor 18 determines an average of the car size multipliers over all positions (e.g., all grid cells) (at block 228). As used herein, trajectory may refer to a given trajectory range. For example, the electronic processor 18 may determine trajectories according to ranges of five degrees (e.g., [−5°, 0°], (0°, 5°], (5°, 10°], etc.), ten degrees (e.g., [−10°, 0°], (0°, 10°], (10°, 20°], etc.), twenty degrees (e.g., [−10°, 10°], (10°, 30°], (30°, 50°], etc.), or the like. In some instance, each trajectory range is a single degree range.

For each trajectory, the electronic processor 18 further averages the average car size multipliers determined at block 228 over all offline training video data sets (at block 232). In some instances, the operations performed at blocks 228 and 232 are combined such that the electronic processor 18 determines size multipliers for each trajectory computed over different videos and different cells in each video.

As described above, in some instances, the electronic processor 18 determines the size multiplier for a given combination of position and trajectory by extrapolating and/or interpolating the size multiplier based on size multiplier values corresponding to neighboring combinations of position and trajectory.

Figure 8:
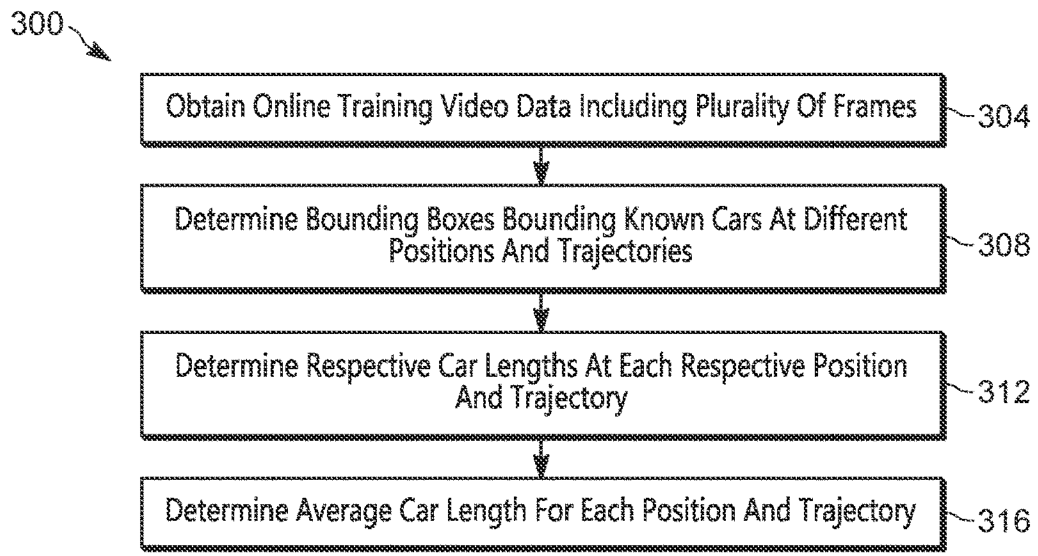
FIG. 8 illustrates a method for learning average car sizes, according to some examples.

Referring again to FIG. 6, the method 100 also includes, performing, with the electronic processor 18, a second, onsite training to learn average car sizes at each position within the field of view of the camera 10 for each direction of travel at a region of interest (at block 108). The onsite average car size training performed at block 108 may be substantially similar to the onsite average car size training described above with respect to FIG. 4A. For example, FIG. 8 illustrates a method 300 implemented by, for example, the electronic processor 18 for performing average car size training (e.g., at block 108 of the method 100).

The method 300 includes obtaining onsite training video data including a plurality of frames of the region of interest captured by the image sensor 14 (at block 304). The electronic processor 18 determines a plurality of bounding boxes bounding respective detected vehicles known to be cars (such as, for example, the known car 64 illustrated in FIG. 4A) in the plurality of frames (at block 308).

The electronic processor 18 determines the respective measured car lengths of the known cars (e.g., based on respectively determined trajectories and bounding boxes of the respective known cars) (at block 312). For each of a plurality of respective combinations of positions within the field of view (e.g., respective grid cells) and trajectories, the electronic processor 18 determines a corresponding average measured car length of the respective measured car lengths for the respective combination of position and trajectory (at block 316). As described above, in some instances, the electronic processor 18 determines the average measured car length for a given combination of position and trajectory by extrapolating and/or interpolating the average measured car length based on average measured car lengths corresponding to neighboring combinations of position and trajectory.

Figure 9:
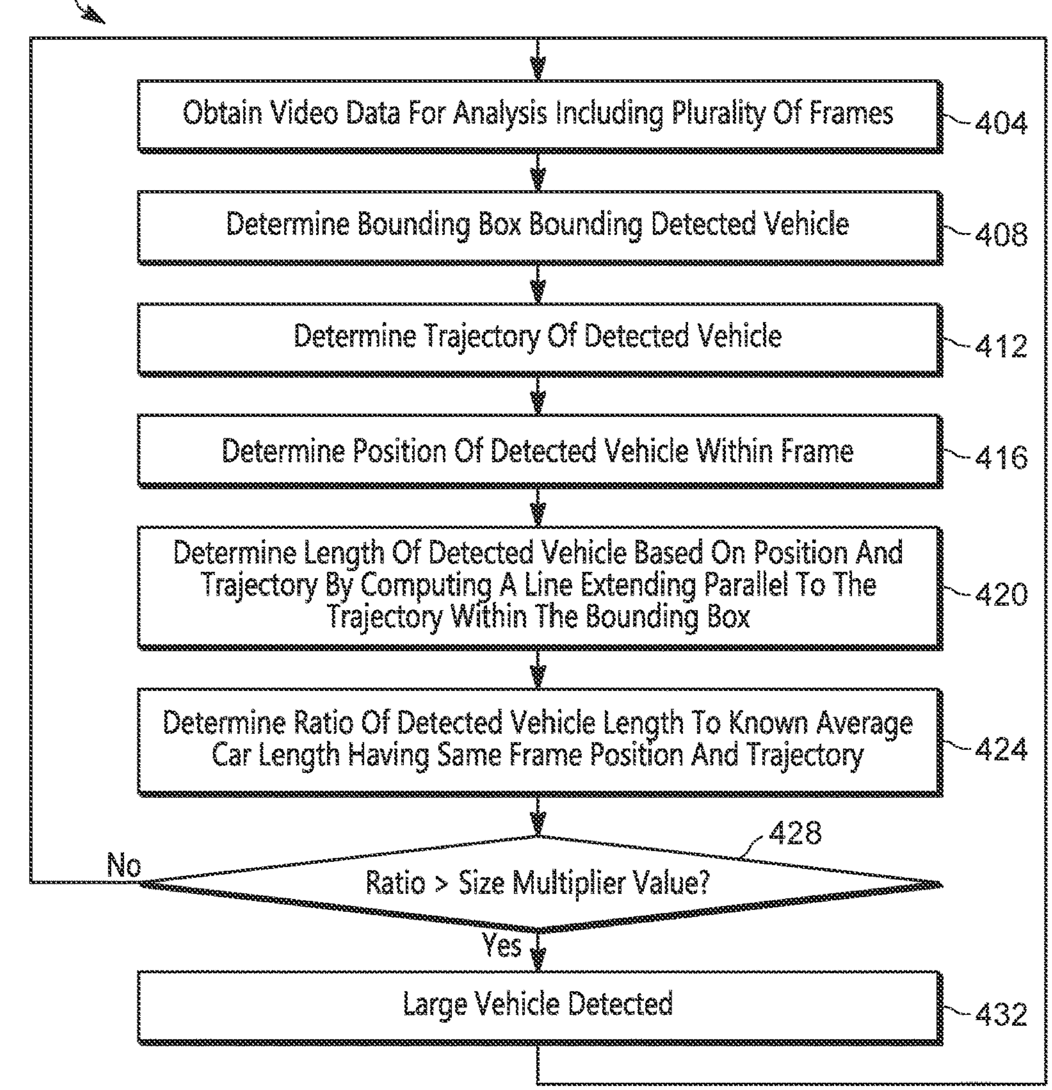
FIG. 9 illustrates a method for detecting large vehicles, according to some examples.

Referring again to FIG. 6, the method 100 also includes, performing, with the electronic processor 18, large vehicle detection for the region of interest (e.g., the region of interest described above with respect to block 108) (at block 112). The large vehicle detection performed at block 112 may be substantially similar to the large vehicle detection described above with respect to FIG. 4B. For example, FIG. 9 illustrates a method 400 implemented by, for example, the electronic processor 18 for performing average car size training (e.g., at block 112 of the method 100).

The method 400 includes obtaining, with the electronic processor 18, analysis video data including a plurality of frames of the region of interest captured by the image sensor 14 (at block 404). The electronic processor 18 determines a bounding box bounding a detected vehicle in the plurality of frames (e.g., the bounding box 74 bounding the detected vehicle 72 illustrated in FIG. 4B) (at block 408). The electronic processor 18 determines a trajectory of the detected vehicle based on changes in location of the bounding box in the plurality of frames (e.g., changes in location of a predetermined point in the bounding box) (at block 412).

The electronic processor 18 determines a position of the detected vehicle within at least one frame of the video data, for example, by placing a grid over the at least one frame and selecting a cell of the grid at least containing a predetermined portion of the bounding box (at block 416). The electronic processor 18 determines the length of the detected vehicle by, for example, computing a line segment extending parallel to the trajectory and being bound by the bounding box 74 (at block 420).

The electronic processor 18 determines whether the length of the detected vehicle is greater than a threshold by, for example, determining a ratio of the length of the detected vehicle to a known average measured car length for the detected vehicle's combination of position (e.g., the known average measured car length determined at block 108 of the method 100) and trajectory (at block 424) and determining whether the ratio is greater than or equal to a size multiplier value for the detected vehicle's combination of position and trajectory (e.g., the size multiplier value determined at block 104 of the method 100) (at block 428).

In response to determining that the ratio of the length of the detected vehicle to the corresponding average measured car length for the position and trajectory is greater than or equal to the size multiplier value for the corresponding position and trajectory ("YES" at block 428), the electronic processor 18 determines that a large vehicle is detected (at block 432). Alternatively or in addition, the electronic processor 18 may store the determined ratio for each detected vehicle in memory, and provide a slider to a user interface of a user device that, when operated by the user, allows the user to adjust the ratio using the slider in order to refine large vehicle detection results. For example, based on a state of the slider indicative of a selected ratio, the electronic processor 18 may highlight vehicles in the analysis video data that have a ratio that is larger than the selected ratio. The slider therefore enables a user to determine the most appropriate large vehicle thresholds for each use case and view the large vehicle detection results according to a variety of thresholds.

In some instances, determining that a large vehicle is detected includes transmitting a message to an external device (e.g., a user device communicatively connected to the camera 10) indicating that a large vehicle is detecting, incrementing a count of detected large vehicles for the region of interest, or otherwise logging the detection of the large vehicle. In some instances, responsive to detecting a threshold number of large vehicles in the region of interest within a predetermined period of time and/or having the same direction of travel, the electronic processor 18 transmits an alarm to a user device indicating that an abnormal number of large vehicles are detected.

Responsive to determining that a large vehicle is detected, the electronic processor 18 may repeat the steps of the method 400 with respect to other detected vehicles in the region of interest.

In contrast, in response to determining that the ratio of the length of the detected vehicle to the corresponding average measured car length for the position and trajectory is less than the size multiplier value for the corresponding position and trajectory ("NO" at block 428), the electronic processor 18 may repeat the steps of the method 400 with respect to other detected vehicles in the region of interest.

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for detecting large vehicles, the system comprising:

an electronic processor communicatively connected to an image sensor and configured to:

obtain video data from the image sensor;

determine a bounding box bounding a detected vehicle in a plurality of frames of the video data;

determine a trajectory of the detected vehicle based on changes in location of the bounding box in the plurality of frames;

determine a position of the detected vehicle within at least one frame of the plurality of frames;

based on the trajectory of the detected vehicle, the bounding box, and the position of the detected vehicle within the at least one frame, determine a length of the detected vehicle;

determine a threshold based on the trajectory and the position of the detected vehicle within the at least one frame;

determine whether the length of the detected vehicle is greater than the threshold by:

determining a ratio of the length of the detected vehicle to an average measured car length at the position of the detected vehicle within the at least one frame and at the trajectory of the detected vehicle; and determining whether the ratio of the length of the detected vehicle to the average measured car length is greater than or equal to a size multiplier; and in response to determining that the length of the detected vehicle is greater than the threshold, make a determination that a large vehicle is detected.

2. The system of claim 1, wherein the electronic processor is configured to determine the length of the detected vehicle by computing a line segment extending parallel to the trajectory and being bound by the bounding box.

3. The system of claim 2, wherein the line segment is positioned across a largest distance within the bounding box according to the trajectory.

4. The system of claim 1, wherein the electronic processor is configured to determine the position of the detected vehicle in the at least one frame of the plurality of frames by:

placing a grid over the at least one frame, the grid defining a plurality of cells, and selecting a first cell of the plurality of cells, wherein at least a portion of the bounding box is located within the first cell.

5. The system of claim 4, wherein the portion of the bounding box located within the first cell includes a lowermost central point of the bounding box.

6. The system of claim 1, wherein the electronic processor is configured to determine the size multiplier by:

obtaining, before obtaining the video data, additional video data including a second plurality of frames;

determining a plurality of second bounding boxes bounding respective second detected vehicles known to be cars in the second plurality of frames; determining a plurality of third bounding boxes bounding respective third detected vehicles known to be large vehicles in the second plurality of frames;

determining respective lengths of the second detected vehicles and third detected vehicles; and determining the size multiplier as a ratio of an average length of the third detected vehicles to an average length of the second detected vehicles.

7. The system of claim 6, wherein the electronic processor is configured to determine the size multiplier during an offline training period.

8. The system of claim 1, wherein the size multiplier is a user-selected value.

9. The system of claim 1, wherein the electronic processor is configured to determine the size multiplier at the position of the detected vehicle within the at least one frame by interpolating and/or extrapolating the average measured car length based on average measured car lengths at positions neighboring the position of the detected vehicle.

10. The system of claim 1, wherein the electronic processor is configured to determine the average measured car length at the position of the detected vehicle and at the trajectory of the detected vehicle by:

obtaining, before obtaining the video data, additional video data including a second plurality of frames;

determining a plurality of second bounding boxes bounding respective second detected vehicles known to be cars in the second plurality of frames in the second plurality of frames;

determining respective lengths of the respective second detected vehicles at respective positions and trajectories; and for each respective position and trajectory, determining an average length of the second detected vehicles at the respective position and trajectory.

11. The system of claim 10, wherein the electronic processor is configured to determine the average measured car length at the position of the detected vehicle and at the trajectory of the detected vehicle during an onsite training period, and wherein a field of view associated with the image data is the same as a field of view associated with the additional video data.

12. The system of claim 1, wherein the electronic processor is configured to determine the average measured car length at the position of the detected vehicle within the at least one frame by interpolating and/or extrapolating the average measured car length based on average measured car lengths at positions neighboring the position of the detected vehicle.

13. The system of claim 1, wherein the average measured car length is a user-selected value.

14. The system of claim 1, wherein the image sensor and the electronic processor are included in a camera that is at least partially uncalibrated.

15. A method for detecting large vehicles, the method comprising:

obtaining video data from an image sensor;

determining a bounding box bounding a detected vehicle in a plurality of frames of the video data;

determining a trajectory of the detected vehicle based on changes in location of the bounding box in the plurality of frames;

determining a position of the detected vehicle within at least one frame of the plurality of frames;

determining a threshold based on the trajectory and the position of the detected vehicle within the at least one frame;

based on the trajectory of the detected vehicle, the bounding box, and the position of the detected vehicle within the at least one frame, determining a length of the detected vehicle;

determining whether the length of the detected vehicle is greater than the threshold by:

determining a ratio of the length of the detected vehicle to an average measured car length at the position of the detected vehicle within the at least one frame and at the trajectory of the detected vehicle; and determining whether the ratio of the length of the detected vehicle to the average measured car length is greater than or equal to a size multiplier; and in response to determining that the length of the detected vehicle is greater than the threshold, making a determination that a large vehicle is detected.

16. The method of claim 15, wherein determining the length of the detected vehicle includes computing a line segment extending parallel to the trajectory and being bound by the bounding box.

17. The method of claim 16, wherein the line segment is positioned across a largest distance within the bounding box according to the trajectory.

18. The method of claim 15, wherein determining the position of the detected vehicle in the at least one frame of the plurality of frames includes:

placing a grid over the at least one frame, the grid defining a plurality of cells, and selecting a first cell of the plurality of cells, wherein at least a portion of the bounding box is located within the first cell.

* * * * *